(12) United States Patent
Song et al.

(10) Patent No.: US 12,034,673 B2
(45) Date of Patent: Jul. 9, 2024

(54) METHOD FOR REPORTING CSI REPORT, TERMINAL DEVICE, AND NETWORK DEVICE

(71) Applicant: VIVO MOBILE COMMUNICATION CO., LTD., Guangdong (CN)

(72) Inventors: Yang Song, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 639 days.

(21) Appl. No.: 17/213,011

(22) Filed: Mar. 25, 2021

(65) Prior Publication Data

US 2021/0218540 A1  Jul. 15, 2021

Related U.S. Application Data

(63) Continuation of application No. PCT/CN2019/101994, filed on Aug. 22, 2019.

(30) Foreign Application Priority Data

Sep. 26, 2018 (CN) .......................... 201811126469.4

(51) Int. Cl.
*H04L 5/00* (2006.01)
*H04W 24/10* (2009.01)

(52) U.S. Cl.
CPC ........... *H04L 5/0057* (2013.01); *H04W 24/10* (2013.01)

(58) Field of Classification Search
None
See application file for complete search history.

(56) References Cited

U.S. PATENT DOCUMENTS

2014/0112184 A1  4/2014  Chai
2014/0328327 A1  11/2014  Xiao et al.
(Continued)

FOREIGN PATENT DOCUMENTS

CN  102882612 A  1/2013
CN  103220704 A  7/2013
(Continued)

OTHER PUBLICATIONS

JP Office Action in Application No. 2021-517444 dated May 9, 2022.
(Continued)

*Primary Examiner* — Jamaal Henson
(74) *Attorney, Agent, or Firm* — Brooks Kushman P.C.

(57) ABSTRACT

Embodiments of this application provide a method for reporting a CSI report, a terminal device, and a network device. The method includes: receiving first information from a network device, where the first information is used to indicate any one of the following measurement quantities: reference signal received quality RSRQ and signal to interference plus noise ratio SINR; or the first information is used to indicate at least two of the following measurement quantities: reference signal received power RSRP, RSRQ, and SINR; and reporting a CSI report to the network device according to the first information, where the CSI report includes a measurement quantity indicated by the first information. This application is applied to beam reporting.

20 Claims, 4 Drawing Sheets

(56) References Cited

U.S. PATENT DOCUMENTS

| | | | |
|---|---|---|---|
| 2015/0382205 A1* | 12/2015 | Lee | H04W 52/365 370/329 |
| 2017/0237584 A1 | 8/2017 | Yan et al. | |
| 2018/0219664 A1* | 8/2018 | Guo | H04W 24/10 |
| 2018/0227031 A1* | 8/2018 | Guo | H04W 24/10 |
| 2018/0262313 A1* | 9/2018 | Nam | H04L 5/0044 |
| 2019/0058517 A1* | 2/2019 | Kang | H04L 5/005 |
| 2019/0109626 A1* | 4/2019 | Park | H04B 7/0658 |
| 2019/0182683 A1* | 6/2019 | Khirallah | H04B 7/0695 |
| 2019/0238282 A1 | 8/2019 | Cao | |
| 2020/0196173 A1* | 6/2020 | Da Silva | H04B 7/0695 |
| 2021/0120446 A1* | 4/2021 | Zhang | H04W 36/0083 |

FOREIGN PATENT DOCUMENTS

| | | | |
|---|---|---|---|
| CN | 108337065 A | 7/2018 | |
| CN | 108370364 A | 8/2018 | |
| EP | 2 733 982 A1 | 5/2014 | |
| EP | 2 800 412 B1 | 6/2017 | |

OTHER PUBLICATIONS

"3rd Generation Partnership Project; Technical Specification Group Radio Access Network; NR; Radio Resource Control (RRC) protocol specification (Release 15)" 3GPP TS 38.331 V15.2.1, Jun. 2018.

EP Search Report in Application No. 19864056.7 dated Oct. 8, 2021.

KR Office Action in Application No. 10-2021-7011396 dated Apr. 16, 2021.

"CR to 38.331 for applicability of s-Measure [H285]" 3GPP TSG-RAN WG2 # 103, Huawei, HiSilicon, R2-1812333, Aug. 20, 2018.

CN Office Action in Application No. 201811126469.4 dated Sep. 29, 2020.

"On Interference-aware Beam Measurement and Reporting" 3GPP TSG-RAN WG1 Meeting #94, Intel Corporation, R1-1808721, Aug. 20, 2018.

"Beam measurement and reporting using L1-RSRQ and SINR" 3GPP TSG-RAN WG1 Meeting #94, Huawei, HiSilicon, R1-1809123, Aug. 20, 2018.

Written Opinion and International Search Report in Application No. PCT/CN2019/101994 dated Oct. 30, 2019.

\* cited by examiner

METHOD FOR REPORTING CSI REPORT, TERMINAL DEVICE, AND NETWORK DEVICE

This application is a continuation application of International Application No. PCT/CN2019/101994 filed on Aug. 22, 2019, which claims priority to Chinese Patent Application No. 201811126469.4, filed with Chinese Patent Office on Sep. 26, 2018, and entitled "METHOD FOR REPORTING CSI REPORT, TERMINAL DEVICE, AND NETWORK DEVICE", which is incorporated herein by reference in its entirety.

TECHNICAL FIELD

This application relates to the field of communications technologies, and in particular, to a method for reporting a channel state information (CSI) report, a terminal device, and a network device.

BACKGROUND

As defined in Rel-15, an RSRP (generally referred to as L1-RSRP, namely layer 1-RSRP) of a CSI-RS resource or an SSB resource in a CSI report that is reported by UE to a network device is used for beam reporting.

However, a legacy CSI report merely includes an RSRP for beam reporting, and an interference problem is not considered. As a result, a network device cannot accurately select the most appropriate beam for the UE.

SUMMARY

According to a first aspect, an embodiment of this application provides a method for reporting a CSI report, applied to a terminal device. The method includes:
  receiving first information from a network device, where the first information is used to indicate any one of the following measurement quantities: reference signal received quality (RSRQ) and signal to interference plus noise ratio (SINR); or the first information is used to indicate at least two of the following measurement quantities: reference signal received power (RSRP), RSRQ, and SINR; and
  reporting a CSI report to the network device according to the first information, where the CSI report includes a measurement quantity indicated by the first information.

According to a second aspect, an embodiment of this application provides a method for reporting a CSI report, applied to a network device. The method includes:
  transmitting first information to a terminal device, where the first information is used to indicate any one of the following measurement quantities: RSRQ and SINR; or the first information is used to indicate at least two of the following measurement quantities: RSRP, RSRQ, and SINR; and the first information is used to indicate the terminal device to report a CSI report to the network device according to the first information, where the CSI report includes a measurement quantity indicated by the first information.

According to a third aspect, an embodiment of this application provides a terminal device, including:
  a receiving module, configured to receive first information from a network device, where the first information is used to indicate any one of the following measurement quantities: RSRQ and SINR; or the first information is used to indicate at least two of the following measurement quantities: RSRP, RSRQ, and SINR; and
  a transmitting module, configured to report a CSI report to the network device according to the first information received by the receiving module, where the CSI report includes a measurement quantity indicated by the first information.

According to a fourth aspect, an embodiment of this application provides a network device, including:
  a transmitting module, configured to transmit first information to a terminal device, where the first information is used to indicate any one of the following measurement quantities: RSRQ and SINR; or the first information is used to indicate at least two of the following measurement quantities: RSRP, RSRQ, and SINR; and the first information is used to indicate the terminal device to report a CSI report to the network device according to the first information, where the CSI report includes a measurement quantity indicated by the first information.

According to a fifth aspect, an embodiment of this application provides a terminal device, including a processor, a memory, and a computer program stored in the memory and capable of running on the processor. When the computer program is executed by the processor, the steps of the method for reporting the CSI report described in the first aspect are implemented.

According to a sixth aspect, an embodiment of this application provides a network device, including a processor, a memory, and a computer program stored in the memory and capable of running on the processor. When the computer program is executed by the processor, the steps of the method for reporting the CSI report described in the second aspect are implemented.

According to a seventh aspect, an embodiment of this application provides a computer-readable storage medium. A computer program is stored in the computer-readable storage medium, and when the computer program is executed by a processor, the steps of the foregoing method for reporting the CSI report are implemented.

DESCRIPTION OF EMBODIMENTS

Figure 1:
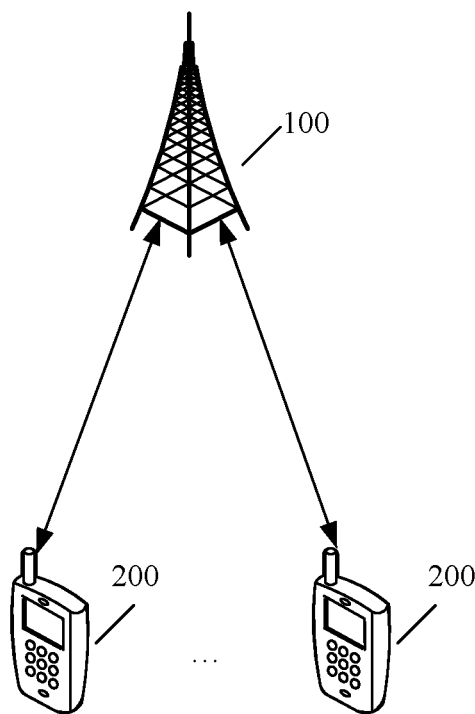
FIG. 1 is a possible schematic structural diagram of a communications system according to an embodiment of this application.

For ease of understanding, the following describes some of the terms included in the embodiments of this application.

1. CSI Report

After receiving CSI report configuration information (for example, CSI report setting or CSI-reportConfig) configured for a terminal device by a network device, the terminal device may send a CSI report to the network device based on configuration in the CSI report configuration information.

In the related art, when the CSI report configuration information indicates that a report quantity (reportQuantity) of the terminal device is "cri-RSRP", which is CSI-RS resource indexes (CRI) and L1-RSRPs corresponding to the resource indexes, or is "ssb-Index-RSRP", which is synchronization signal block resource indexes (SSBRI) and L1-RSRPs corresponding to the resources, it indicates that the CSI report is used for beam reporting, and then the terminal device reports one or more optimal CSI-RS resource indexes or SSB resource indexes (corresponding to downlink transmit beams of a base station) that are measured and selected by the terminal device, and corresponding L1-RSRPs.

However, a legacy CSI report merely includes an L1-RSRP for beam reporting, and an interference problem is not considered. As a result, the network device cannot accurately select the most appropriate beam for the terminal device.

To resolve this problem, in the embodiments of this application, the network device sends first information to indicate the terminal device to include RSRQ and SINR in the CSI report to be reported by the terminal device, or to indicate to include at least two of RSRP, RSRQ, and SINR in the CSI report to be reported by the terminal device. In other words, the RSRQ and/or the SINR is added to the legacy CSI report, so that an interference factor can be considered in the CSI report, and the network device can select the most appropriate beam more accurately based on the CSI report for the terminal device.

The RSRP, RSRQ, and SINR mentioned in this application are all used for beam reporting, and for example, may be referred to as L1-RSRP, L1-RSRQ, and L1-SINR, which are referred to as RSRP, RSRQ, and SINR for short hereinafter. However, the RSRP, RSRQ, and SINR mentioned in this application have definitions different from those of an RSRP, RSRQ, and SINR that are defined for radio resource management (RRM) in Rel-15.

2. RSRP

The RSRP (which may be referred to as L1-RSRP, namely layer 1-RSRP) in this application is used for beam reporting, as already defined in Rel-15.

Specifically, a legacy L1-RSRP specific to a synchronization signal SS may be used for beam reporting. A legacy L1-RSRP specific to a CSI-RS may also be used for beam reporting.

3. RSRQ (1) RSRQ defined in Rel-15:

For the SS, SS-RSRQ is defined as: K×Synchronization signal reference signal received power (SS-RSRP)/NR carrier received signal strength indicator (NR carrier RSSI).

K is a quantity of resource blocks (RB) of a measurement bandwidth for the NR carrier RSSI, and measurement for a numerator and denominator of the SS-RSRQ is performed on the same set of RBs. The NR carrier RSSI is a linear average value of total received powers (watts) of N RBs measured in some OFDM symbols of a measurement time resource in the measurement bandwidth, and received signal sources include received powers, neighboring channel interference, thermal noise, and the like of serving cells and non-serving cells of a same channel.

The measurement time resource of the NR carrier RSSI is limited to be within SS/PBCH block measurement time configuration (SMTC) window duration.

For the CSI, CSI-RSRQ is defined as: K×CSI-RSRP/CSI-RSSI.

K is a quantity of RBs in a measurement bandwidth of the CSI-RSSI, and measurement for a numerator and denominator of the CSI-RSRQ is performed on the same set of RBs. The CSI-RSSI is a linear average value of total received powers (watts) of N RBs measured in some OFDM symbols of a measurement time resource in the measurement bandwidth, and received signal sources include received powers, neighboring channel interference, thermal noise, and the like of serving cells and non-serving cells of a same channel.

The measurement time resource of the CSI-RSSI corresponds to OFDM symbols in which CSI-RS transmission time is configured.

(2) The RSRQ (which may be referred to as L1-RSRQ, namely layer 1-RSRQ) defined in this application is defined as: a ratio of an RSRP measured on a first resource to an RSSI measured on a second resource corresponding to the first resource, where the first resource is a CSI-RS resource or an SSB resource.

Specifically, the RSRQ is defined as a ratio of H times of the RSRP measured on the first resource to the RSSI measured on the second resource corresponding to the first resource, where H is a quantity of RBs of the first resource in the frequency domain bandwidth, and if the frequency domain bandwidth of the first resource is consistent with that of the second resource, H is also a quantity of RBs in the measurement bandwidth for the RSSI.

To sum up, through comparison between the RSRQ defined in this application and the RSRQ defined in Rel-15, it can be known that the RSRQ defined in this application is specific to a single resource and that a measurement time and a measurement bandwidth are both limited to the corresponding first resource or second resource.

4. SINR (1) SINR defined in Rel-15:

For the SS, SS-SINR is defined as: a linear average value of received signal powers (watts) on REs for transmitting secondary synchronization signals divided by a linear average value of noise and interference powers (watts) on the REs for transmitting the secondary synchronization signals on a same frequency band. The measurement time resource of the SS-SINR is limited to be within the SS/PBCH block SMTC window duration.

It should be noted that, in addition to the secondary synchronization signal, a demodulation reference signal (DMRS) of the PBCH may also be used to determine the SS-SINR, and the higher layer may indicate to measure the SS-SINR on some SS/PBCH blocks.

For the CSI, CSI-SINR is defined as: a linear average value of signal received powers (watts) on REs for transmitting CSI-RSs divided by a linear average value of noise and interference powers (watts) on the REs for transmitting the CSI-RSs on a same frequency band.

(2) The SINR (which may be referred to as L1-SINR, namely layer 1-SINR) defined in this application is defined as: a ratio of a linear average value of signal received powers (watts) measured on the first resource to noise and interference powers (watts) measured on a third resource corresponding to the first resource. The first resource is a CSI-RS resource or an SSB resource.

To sum up, through comparison between the SINR defined in this application and the SINR defined in Rel-15, it can be known that the SINR defined in this application is specific to a single resource, and that a measurement time and a measurement bandwidth are both limited to the corresponding first resource or third resource.

5. Other Terms

The term "and/or" in this specification describes only an association relationship for describing associated objects and represents that three relationships may exist. For example, A and/or B may represent the following three cases: A alone, both A and B, and B alone. In addition, the symbol "/" in this specification generally represents an "or" relationship between associated objects. In a formula, the symbol "/" indicates a "division" relationship between the associated objects. Unless otherwise specified, "a plurality of" in this specification refers to two or more that two.

For ease of clear description of the technical solutions of the embodiments of this application, in the embodiments of this application, the words "first", "second", and the like are used to distinguish the same items or similar items having substantially the same functions or roles, and those skilled in the art can understand that the words "first", "second", and the like do not constitute any limitation on a quantity and an execution order. It should be noted that, in the embodiments of this application, words such as "an example" or "for example" are used to represent an example, an instance, or an illustration. Any embodiment or design scheme described as "an example" or "for example" in the embodiments of this application should not be construed as being more preferred or advantageous than other embodiments or design schemes. To be precise, the terms such as "an example" or "for example" are intended to present a related concept in a specific manner.

The following describes the technical solutions provided in this application with reference to the accompanying drawings.

The technical solutions provided in this application can be applied to various communications systems, such as a 5G communications system, a future evolved system, or a plurality of communication fusion systems. Examples of various application scenarios may include scenarios such as machine-to-machine (M2M), D2M, macro-micro communication, enhanced mobile Internet (eMBB), ultra-reliable low-latency communications (uRLLC), and mass machine type communication (mMTC). These scenarios include, but are not limited to, scenarios such as communication between terminal devices, communication between network devices, or communication between a network device and a terminal device. The embodiments of this application can be applied to communication between a network device and a terminal device, or communication between terminal devices, or communication between network devices in a 5G communications system.

FIG. 1 is a possible schematic structural diagram of a communications system included in the embodiments of this application. As shown in FIG. 1, the communications system includes at least one network device 100 (only one is shown in FIG. 1) and one or more terminal devices 200 to which each network device 100 is connected.

The network device 100 may be a base station, a core network device, a transmission and reception point (TRP), a relay station, an access point, or the like. The network device 100 may be a base transceiver station (BTS) in a Global System for Mobile Communications (GSM) or Code Division Multiple Access (CDMA) network, may be an NB (NodeB) in Wideband Code Division Multiple Access (WCDMA), or may be an eNB or eNodeB (evolutional NodeB) in LTE. The network device 100 may alternatively be a radio controller in a cloud radio access network (CRAN) scenario. The network device 100 may alternatively be a network device in a 5G communications system or a network device in a future evolved network. However, the use of words does not constitute any limitation on this application.

The terminal device 200 may be a wireless terminal device or may be a wired terminal device. The wireless terminal device may be a device that provides voice and/or other service data connectivity to a user, a handheld device having a wireless communication function, a computing device or other processing devices connected to a wireless modem, an in-vehicle device, a wearable device, a terminal device in a future 5G network, or a terminal device in a future evolved PLMN network, or the like. The wireless terminal device may communicate with one or more core networks via a radio access network (RAN). The wireless terminal device may be a mobile terminal device such as a mobile phone (or referred to as "cellular" phone) and a computer having a mobile terminal device, such as a portable, pocket-sized, handheld, computer built-in, or in-vehicle mobile apparatus, which exchanges voice and/or data with the radio access network; or may be a device such as a personal communication service (PCS) phone, a cordless phone, a session initiation protocol (SIP) phone, a wireless local loop (WLL) station, or a personal digital assistant (PDA). The wireless terminal device may also be a mobile device, user equipment (UE), a UE terminal device, an access terminal device, a wireless communication device, a terminal device unit, a terminal device station, a mobile station, a mobile, a remote station, a remote site, a remote terminal device (Remote Terminal), a subscriber unit, a subscriber station, a user agent, a terminal device apparatus, or the like. As an example, in this embodiment of this application, FIG. 1 uses an example that the terminal device is a mobile phone.

Figure 2:
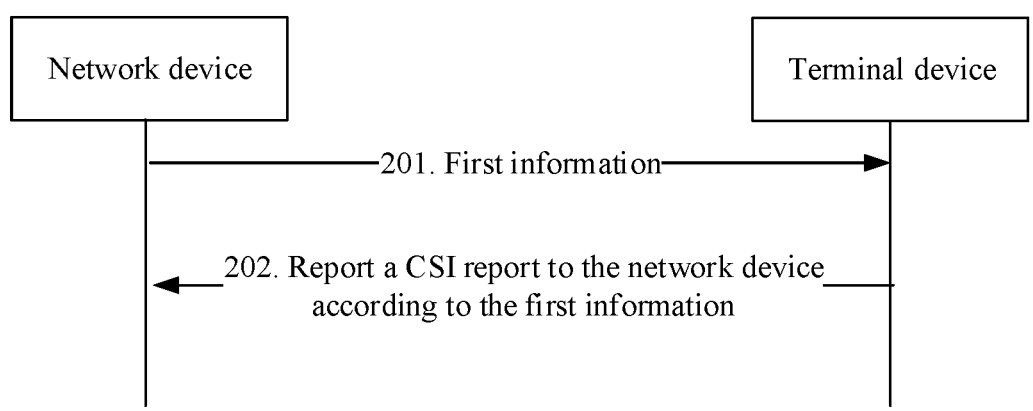
FIG. 2 is a schematic flowchart of a method for reporting a CSI report according to an embodiment of this application.

FIG. 2 is a schematic flowchart of a method for reporting a CSI report according to an embodiment of this application. As shown in FIG. 2, the method for reporting the CSI report according to this embodiment of this application may include the following steps.

Step 201: A terminal device receives first information from a network device.

Correspondingly, the network device at the peer end transmits the first information to the terminal device.

The network device in this embodiment of this application may be a network device in the communications system shown in FIG. 1, for example, a base station. The terminal device in this embodiment of this application may be a terminal device in the communications system shown in FIG. 1.

In this embodiment of this application, the first information is used to indicate any one of the following measurement quantities: RSRP, RSRQ, and SINR, or the first information is used to indicate at least two of the following measurement quantities: RSRP, RSRQ, and SINR.

In this embodiment of this application, the first information is used to indicate the terminal device to report at least one of the measurement quantities: RSRP, RSRQ, and SINR.

In this embodiment of this application, the first information may be CSI report configuration information (for example, CSI report setting/CSI-reportConfig), or may be reportQuantity in the CSI report configuration information (for example, the network device uses the reportQuantity in the CSI report configuration information to indicate the terminal device to report at least one of the following measurement quantities: RSRP, RSRQ, and SINR). The CSI report configuration information includes configuration information corresponding to a measurement quantity that needs to be reported by each terminal device, for example, a quantity of resources and a period.

In one example, the network device may separately indicate, through first information in a plurality of CSI report settings, the terminal device to report the RSRP, RSRQ, and SINR, where configurations such as a period and a quantity of resources corresponding to each piece of first information may be different. For example, configuration may be performed in three different CSI report settings. RSRP to be reported by the terminal device is configured in one CSI report setting, RSRQ to be reported by the terminal device is configured in one CSI report setting, and SINR to be reported by the terminal device is configured in one CSI report setting. A CSI report corresponding to the RSRP has a long period, and a CSI report corresponding to the RSRQ has a short period.

In one example, the network device may indicate, through first information in one CSI report setting, the terminal device to report at least two of the following measurement quantities: RSRP, RSRQ, and SINR, where configurations, such as a period and a quantity of resources, corresponding to each measurement quantity in the first information may be the same or different. For example, configuration may be performed in one CSI report setting. At least two of the following measurement quantities to be reported by the terminal device: RSRP, RSRQ, and SINR are configured in the CSI report setting, where configurations, such as a period and a quantity of resources, corresponding to each measurement quantity in a CSI report corresponding to the CSI report setting may be the same or different.

Optionally, in this embodiment of this application, the first information is used to indicate to include at least one of the RSRP, RSRQ, and SINR in the CSI report to be reported by the terminal device based on the M first resources. For example, the M first resources are resources configured by the network device for the terminal device, and the M first resources include M CSI-RS resources and/or M SSB resources, where M is greater than or equal to 1.

Step 202: The terminal device reports a CSI report to the network device according to the first information.

In this embodiment of this application, the CSI report includes a measurement quantity indicated by the first information.

In this embodiment of this application, the terminal device may report different CSI reports according to different first information. Specifically, the following two possibilities may be included.

In a First Possible Implementation:

In a case in which the first information is used to indicate at least two of the following measurement quantities: RSRP, RSRQ, and SINR:

Specifically, in the case in which the first information is used to indicate at least two of the following measurement quantities: RSRP, RSRQ, and SINR, the first information is used to indicate the terminal device to report second information corresponding to a first measurement quantity and third information corresponding to at least one second measurement quantity, and a corresponding CSI report includes the second information corresponding to the first measurement quantity and the third information corresponding to the at least one second measurement quantity.

The first measurement quantity is one of at least two measurement quantities, the at least one second measurement quantity is a measurement quantity other than the first measurement quantity in the at least two measurement quantities, and the third information corresponding to the at least one second measurement quantity includes third information corresponding to each second measurement quantity.

1. The Second Information Corresponding to the First Measurement Quantity

Further, the second information corresponding to the first measurement quantity includes resource indexes of the N first resources and first values corresponding to the N first resources, and the first values are used to indicate first measurement quantities corresponding to the N first resources.

It should be noted that a sequence of the first values corresponding to the N first resources in the second information corresponds to a sequence of the resource indexes of the N first resources.

For example, the first values corresponding to the N first resources include a first value of each of the N first resources, and a first value of any one first resource is used to indicate a first measurement quantity corresponding to the first resource.

Example 1: The first value of each of the N first resources is a first measurement quantity of the first resource. For example, using the RSRQ as an example, the first values of the N first resources are RSRQs of the N first resources.

Example 2: A first value of a fourth resource in the N first resources is a first measurement quantity, and first values of remaining N−1 first resources other than the fourth resource in the N first resources are first measurement quantity differences. The fourth resource is a first resource with the largest first measurement quantity in the N first resources.

It should be noted that a first measurement quantity difference of any one of the N−1 first resources may be a difference between a first measurement quantity of the any one first resource and the first measurement quantity of the fourth resource (namely, the largest first measurement quantity), or may be a difference between the first measurement quantity of the fourth resource and the first measurement quantity of the any one first resource, which is not limited in this application.

For example, using the first measurement quantity being RSRQ as an example, if the first information indicates to report RSRQs of four SSB resources, the terminal device reports RSRQs of four SSB resources that are selected from the M SSB resources configured by the network device. Resource indexes of the four selected SSB resources are SSBRI #1, SSBRI #2, SSBRI #3, and SSBRI #4, and corresponding RSRQs are RSRQ #1, RSRQ #2, RSRQ #3, and RSRQ #4. If the SSBRI #1 is an index of an SSB resource with the largest RSRQ, a first value corresponding to SSBRI #2 is differential RSRQ #2 (that is, RSRQ #2-RSRQ #1), a first value corresponding to SSBRI #3 is differential RSRQ #3 (that is, RSRQ #3-RSRQ #1), and a first value corresponding to SSBRI #4 is differential RSRQ #4 (that is, RSRQ #4-RSRQ #1). Specifically, a corresponding CSI report is shown in the following Table 1.

TABLE 1

| L1-RSRQ |
| --- |
| SSBRI #1 |
| SSBRI #2 |
| SSBRI #3 |
| SSBRI #4 |
| RSRQ #1 |
| Differential RSRQ #2 |
| Differential RSRQ #3 |
| Differential RSRQ #4 |

It should be noted that the foregoing Table 1 is merely an example, and in practical application, the first measurement quantity may alternatively be RSRP or SINR.

2. The Third Information Corresponding to the at Least One Second Measurement Quantity Further, third information of any one second measurement quantity includes resource indexes of Y first resources and second values corresponding to the Y first resources, or the third information of the any one second measurement quantity includes the second values of the Y first resources.

The second values are used to indicate the any one second measurement quantities corresponding to the Y first resources.

The N first resources are at least one of the M first resources configured by the network device for the terminal device; and the Y first resources are at least one of the M first resources configured by the network device for the terminal device. M and N are greater than or equal to 1, Y is greater than or equal to 0, M is greater than or equal to N, M is greater than or equal to Y, and N is greater than or equal to Y.

It should be noted that the Y first resources may be completely or partially different from the N first resources or the Y first resources are the same as a part or all of the N first resources. That is, in the case in which the first information is used to indicate at least two of the following measurement quantities: RSRP, RSRQ, and SINR, each measurement quantity indicated by the first information for reporting and corresponding configurations may be different, and therefore a resource index and a quantity of resources that are corresponding to each measurement quantity and included in the CSI report reported by the terminal device may be the same or different.

For example, the second values corresponding to the Y first resources include a second value of each of the Y first resources, and a second value of any one first resource is used to indicate the any one second measurement quantity corresponding to the first resource.

Example 3: The second value of each of the Y first resources is the any one second measurement quantity of the first resource. For example, using RSRP as an example, the second values of the Y first resources are RSRPs of the Y first resources.

Example 4: A second value of a fifth resource in the Y first resources is the any one second measurement quantity, and second values of remaining Y−1 first resources other than the fifth resource in the Y first resources are differences of the any one second measurement quantity.

It should be noted that a second measurement quantity difference of any one of the Y−1 first resources may be a difference between a second measurement quantity of the any one first resource and the second measurement quantity of the fifth resource, or may be a difference between the second measurement quantity of the fifth resource and the second measurement quantity of the any one first resource, which is not limited in this application.

Example 4-1: The fifth resource is a first resource with the largest any one second measurement quantity in the Y first resources, that is, the second values of the Y first resources are not related to the first values of the N first resources, and the terminal device uses the first resource corresponding to the largest measurement quantity of the any one second measurement quantities of the Y first resources as the fifth resource.

In one example, in the case in which the fifth resource is the first resource with the largest any one second measurement quantity in the Y first resources, the third information of the any one second measurement quantity includes the resource indexes of the Y first resources and the corresponding second values.

For example, the first measurement quantity being RSRQ and the second measurement quantity being RSRP are used as an example, and it is assumed that the first information indicates to report RSRQs of four SSB resources and RSRPs of four SSB resources. It is assumed that resource indexes of four SSB resources selected by the terminal device for the RSRQ are SSBRI #11, SSBRI #12, SSBRI #13, and SSBRI #14, and resource indexes of four SSB resources selected for the RSRP are SSBRI #21, SSBRI #22, SSBRI #23, and SSBRI #24. Specifically, a corresponding CSI report is shown in the following Table 2.

TABLE 2

| L1-RSRQ | L1-RSRP |
| --- | --- |
| SSBRI #11 | SSBRI #21 |
| SSBRI #12 | SSBRI #22 |
| SSBRI #13 | SSBRI #23 |
| SSBRI #14 | SSBRI #24 |
| RSRQ #11 | RSRP #21 |
| Differential RSRQ #12 | Differential RSRP #22 |
| Differential RSRQ #13 | Differential RSRP #23 |
| Differential RSRQ #14 | Differential RSRP #24 |

For descriptions of the differential RSRP #22, the differential RSRP #23, and the differential RSRP #24 in the foregoing Table 2, refer to the description of the differential RSRPs in the foregoing Table 1. Details are not described herein again.

It should be noted that the foregoing Table 2 is merely an example. In actual application, in this scenario, reporting of the RSRP and the RSRQ is independent; therefore, based on measurement results of the first measurement quantity (RSRQ) and the second measurement quantity (RSRP), indexes of the first resources corresponding to the RSRP and indexes of the first resources corresponding to the RSRQ may be the same or different.

In another example, in a case in which the fifth resource is the first resource with the largest any one second measurement quantity in the Y first resources, and the Y first resources are the same as the N first resources (Y is equal to N), the third information of the any one second measurement quantity includes the resource index of the fifth resource and the second values corresponding to the Y first resources.

For example, the first measurement quantity being RSRP and the second measurement quantity being RSRQ are used as an example, and it is assumed that the first information indicates to report RSRPs and RSRQs of four CSI-RS resources. Resource indexes of four CSI-RS resources selected by the terminal device for the RSRP are CRI #1, CRI #2, CRI #3, and CRI #4, and corresponding first values are RSRP #1, differential RSRP #2, differential RSRP #3, and differential RSRP #4. A resource index of a CSI-RS resource corresponding to the maximum RSRP is CRI #1 (that is, the fourth resource). Corresponding RSRQs are RSRQ #1, RSRQ #2, RSRQ #3, and RSRQ #4. RSRQ #3 corresponding to the CRI #3 is the maximum value of RSRQs of the four CSI-RS resources. The four resources corresponding to the RSRPs are the same as the four resources corresponding to the RSRQs. Therefore, for the RSRQ, the terminal device may report only the CRI #3 (that is, the fifth resource) but not resource indexes of other CSI-RS resources, and RSRQs of resources other than the fifth resource are reported in a form of differential RSRQs. Specifically, a corresponding CSI report is shown in the following Table 3.

TABLE 3

| L1-RSRP | L1-RSRPQ |
|---|---|
| CRI #1 | CRI #3 |
| CRI #2 | |
| CRI #3 | |
| CRI #4 | |
| RSRP #1 | Differential RSRQ #1 |
| Differential RSRP #2 | Differential RSRQ #2 |
| Differential RSRP #3 | RSRQ #3 |
| Differential RSRP #4 | Differential RSRQ #4 |

It can be learned from Table 3 that a CSI-RS resource corresponding to CRI #3 is the fifth resource, a second value corresponding to CRI #3 is the RSRQ, and second values corresponding to other CSI-RS resources are differential RSRQs.

It should be noted that the RSRQ #3 is the maximum value in the four RSRQs, symbols corresponding to the differential RSRQ #1, the differential RSRQ #2, and the differential RSRQ #4 are the same, that is, are all positive or negative.

Example 4-2: The fifth resource is the same as the fourth resource. For example, in a case in which the N first resources are the same as the Y first resources (Y is equal to N), the fifth resource is the same as the fourth resource. Specifically, the terminal device determines, based on the fourth resource, a measurement quantity to be reported for resources other than the fourth resource in the Y first resources.

In one example, the N first resources are the same as the Y first resources (that is, Y is equal to N). In this case, there is no need to report the resource indexes of these first resources, that is, the third information corresponding to the second measurement quantity may include only the second values corresponding to the Y first resources.

For example, the first measurement quantity being RSRQ and the second measurement quantity being RSRP are used as an example, and it is assumed that the first information indicates to report RSRQs of four SSB resources and RSRPs of four SSB resources. First, resource indexes of four SSB resources selected by the terminal device for the RSRQ are SSBRI #1, SSBRI #2, SSBRI #3, and SSBRI #4, and a resource index of an SSB resource corresponding to the maximum RSRQ is SSBRI #1 (that is, the fourth resource). In this case, the SSBRI #1 may be used as the fifth resource, and an RSRP corresponding to the SSBRI #1 and differential RSRPs corresponding to the SSBRI #2, SSBRI #3, and SSBRI #4 may be reported. Specifically, with reference to Table 1, a corresponding CSI report is shown in the following Table 4.

TABLE 4

| L1-RSRQ | L1-RSRP |
|---|---|
| SSBRI #1 | |
| SSBRI #2 | |
| SSBRI #3 | |
| SSBRI #4 | |
| RSRQ #1 | RSRP #1 |
| Differential RSRQ #2 | Differential RSRP #2 |
| Differential RSRQ #3 | Differential RSRP #3 |
| Differential RSRQ #4 | Differential RSRP #4 |

It should be noted that the foregoing RSRP #1 is not necessarily the maximum value of RSRPs of the four SSB resources SSBRI #1, SSBRI #2, SSBRI #3, and SSBRI #4; therefore, symbols of the differential RSRP #2, differential RSRP #3, and differential RSRP #4 may be the same or different, that is, may be positive or negative.

For example, with reference to Table 4, if the second measurement quantity in Table 4 further includes the SINR, a corresponding CSI report is shown in the following Table 5.

TABLE 5

| L1-RSRQ | L1-RSRP | L1-SINR |
|---|---|---|
| SSBRI #1 | | |
| SSBRI #2 | | |
| SSBRI #3 | | |
| SSBRI #4 | | |
| RSRQ #1 | RSRP #1 | SINR #1 |
| differential RSRQ #2 | differential RSRP #2 | differential SINR #2 |
| differential RSRQ #3 | differential RSRP #3 | differential SINR #3 |
| differential RSRQ #4 | differential RSRP #4 | differential SINR #4 |

It should be noted that the fifth resource is selected based on the fourth resource, and therefore RSRP #1 in Table 4 and Table 5 is not necessarily the maximum value of RSRP #1, RSRP #2, RSRP #3, and RSRP #4; likewise, SINR #1 in Table 5 is not necessarily the maximum values of SINR #1, SINR #2, SINR #3, and SINR #4.

For example, a sequence of the resource indexes of the Y first resources in the third information and/or a sequence of the second values corresponding to the Y first resources in the third information corresponds to a sequence of the resource indexes of the Y first resources in the N first resources of the second information (for example, Table 3, Table 4, and Table 5). For example, the first information is specifically used to indicate that the sequence of the resource indexes of the Y first resources in the third information and/or the sequence of the second values corresponding to the Y first resources in the third information corresponds to the sequence of the resource indexes of the Y first resources in the N first resources of the second information.

For example, the terminal device may determine the sequence of the resource indexes of the N first resources in the second information based on the first measurement quantity, and then determine, based on the sequence, the sequence of the resource indexes of the Y first resources in the third information and/or the sequence of the second values corresponding to the Y first resources in the third information.

For example, the N first resources are first resources corresponding to top N first measurement quantities in first measurement quantities of the M first resources that are ranked in descending order; and the Y first resources are first resources whose first measurement quantities are greater than a set threshold in the N first resources.

For example, the first information is used to indicate that the first measurement quantity is a reference measurement quantity, and is used to indicate the terminal device to determine, based on second information corresponding to the reference measurement quantity, the third information corresponding to the second measurement quantity.

Specifically, after receiving the first information, the terminal device may determine the N first resources based on the reference measurement quantity (namely, the first measurement quantity), that is, selecting, from the M first resources, first resources corresponding to N reference measurement quantities with the largest reference measurement quantities, and then determine the Y first resources based on the reference measurement quantities of the N first resources.

It should be noted that Y may be equal to 0, that is, each of the first measurement quantities of the N first resources is less than the set threshold, and in this case, the third information is void, that is, no information of the second measurement quantity is reported.

For example, the first measurement quantity being RSRQ and the second measurement quantities being RSRP and SINR are used as an example, and it is assumed that the first information indicates to report RSRQs of four SSB resources, and RSRPs and SINRs corresponding to SSB resources whose RSRQs are greater than a threshold T in the four SSB resources. If resource indexes of four SSB resources selected by the terminal device for the RSRQ are SSBRI #1, SSBRI #2, SSBRI #3, and SSBRI #4, and RSRQs of the SSBRI #1 and SSBRI #2 are greater than the threshold T, an SSB resource (SSBRI #1) corresponding to the maximum value of L1-RSRQs is the fourth resource in this case. If the fifth resource is the fourth resource, the RSRP and SINR of the SSBRI #1 (namely, RSRP #1 and differential SINR #1) and RSRP and SINR of the SSBRI #2 (namely, RSRP #2 and differential SINR #2) are reported. Specifically, with reference to Table 1, a corresponding CSI report is shown in the following Table 6.

TABLE 6

| L1-RSRQ | L1-RSRP | L1-SINR |
| --- | --- | --- |
| SSBRI #1 | | |
| SSBRI #2 | | |
| SSBRI #3 | | |
| SSBRI #4 | | |
| RSRQ #1 (RSRQ #1 is greater than the threshold T) | RSRP #1 | SINR #1 |
| Differential RSRQ #2 (RSRQ #2 is greater than the threshold T) | Differential RSRP #2 | Differential SINR #2 |
| Differential RSRQ #3 | | |
| Differential RSRQ #4 | | |

It should be noted that the differential RSRP and/or the differential SINR may be positive or negative.

For example, the first measurement quantity being RSRQ and the second measurement quantities being RSRP and SINR are used as an example, and it is assumed that the first information indicates to report RSRQs of four SSB resources, and RSRPs and SINRs corresponding to SSB resources whose RSRQs are greater than a threshold T in the four SSB resources. If resource indexes of four SSB resources selected by the terminal device for the RSRQ are SSBRI #1, SSBRI #2, SSBRI #3, and SSBRI #4, and the RSRQ of the SSBRI #1, the RSRQ of the SSBRI #2, and the RSRQ of the SSBRI #3 are greater than the threshold T, then the RSRP and SINR of the SSBRI #1, the RSRP and SINR of the SSBRI #2, and the RSRP and SINR of the SSBRI #3 are reported.

In this case, an SSB resource (SSBRI #1) corresponding to the maximum value of L1-RSRQs is the fourth resource, and the fifth resource is a resource with the maximum value of RSRPs or SINRs of the SSBRI #1, SSBRI #2, and SSBRI #3. If the maximum value of RSRPs of the SSBRI #1, SSBRI #2, and SSBRI #3 corresponds to the SSBRI #2, the SSBRI #2 is the fifth resource, the resource index SSBRI #2, differential RSRP #1, RSRP #2, and differential RSRP #3 of the fifth resource are reported. If the maximum value of SINRs of the SSBRI #1, SSBRI #2, and SSBRI #3 corresponds to the SSBRI #3, the SSBRI #3 is the fifth resource and then the resource index SSBRI #3, differential RSRP #1, differential RSRP #2, and RSRP #3 of the fifth resource are reported. Specifically, with reference to Table 1, a corresponding CSI report is shown in the following Table 7.

TABLE 7

| L1-RSRQ | L1-RSRP | L1-SINR |
| --- | --- | --- |
| SSBRI #1 | SSBRI #2 | SSBRI #3 |
| SSBRI #2 | | |
| SSBRI #3 | | |
| SSBRI #4 | | |
| RSRQ #1 (RSRQ #1 is greater than the threshold T) | Differential RSRP #1 | Differential SINR #1 |
| Differential RSRQ #2 (RSRQ #2 is greater than the threshold T) | RSRP #2 | Differential SINR #2 |
| Differential RSRQ #3 | Differential RSRP #3 | SINR #3 |
| Differential RSRQ #4 | | |

It should be noted that the plurality of differential RSRPs have the same symbols, that is, are all positive or negative, and the plurality of differential SINRs have the same symbols, that is, are all positive or negative.

In addition, it should be noted that the foregoing Table 1, Table 2, Table 4, Table 5, Table 6, and Table 7 all use the RSRQ as the first measurement quantity, and in actual application, the RSRP or SINR may alternatively be used as the first measurement quantity, which is not illustrated herein.

In a Second Possible Implementation:

In a case in which the first information is used to indicate any one of the following measurement quantities: RSRQ and SINR:

Specifically, in the case in which the first information is used to indicate any one of the following measurement quantities: RSRQ and SINR, the first information is used to indicate the terminal device to report fourth information, and the CSI report includes the fourth information.

The fourth information includes indexes of N first resources and third values corresponding to the N first resources. The third values are used to indicate the any one measurement quantities of the N first resources (specifically referring to the foregoing Table 1), and the N first resources are at least one of the M first resources configured by the network device for the terminal device, where M and N are greater than or equal to 1, and M is greater than or equal to N.

For example, a third value of a sixth resource in the N first resources is the any one measurement quantity, and third values of remaining N−1 first resources other than the sixth resource in the N first resources are a difference of the any one measurement quantity. The sixth resource is a first resource with the largest any one measurement quantity in the N first resources.

It should be noted that a difference of the any one measurement quantity of any one of the N−1 first resources may be a difference between the any one measurement quantity of the any one first resource and the any one measurement quantity of the sixth resource (namely, the largest any one measurement quantity), or may be a difference between the any one measurement quantity of the sixth resource and the any one measurement quantity of the any one first resource, which is not limited in this application.

Definitions and Descriptions of the RSRQ and SINR in this Application:

Optionally, in this embodiment of this application, an RSRQ of one first resource is a ratio of an RSRP measured on the first resource to an RSSI measured on a second resource corresponding to the first resource. Specifically, an RSRQ of one first resource is a ratio of H times of an RSRP measured on the first resource to an RSSI measured on a second resource corresponding to the first resource. H is a quantity of RBs of the first resource in the frequency domain, and if a frequency domain bandwidth of the first resource is consistent with that of the second resource, H is also a quantity of RBs in the measurement bandwidth for the RSSI.

Optionally, in this embodiment of this application, a SINR of one first resource is a ratio of a linear average value of signal received powers measured on the first resource to a noise and interference power measured on a third resource corresponding to the first resource.

In this embodiment of the application, the second resource is used to measure RSSIs. One second resource corresponds to at least one first resource, that is, the second resource may be in a one-to-one correspondence with the first resource, or one second resource may correspond to a plurality of first resources.

In this embodiment of the application, the third resource is used to measure noise and interference powers. One third resource corresponds to at least one first resource, that is, the third resource may be in a one-to-one correspondence with the first resource, or one third resource may correspond to a plurality of first resources.

Further, optionally, in this embodiment of this application, the second resource is a protocol default resource, or the second resource is a resource configured by the network device for the terminal device.

Further, optionally, in this embodiment of this application, the third resource is a protocol default resource, or the third resource is a resource configured by the network device for the terminal device.

In one example, when the network device configures an interference measurement resource (IMR) as the second resource and/or the third resource for the terminal device, one interference measurement resource corresponds to at least one first resource. For example, the interference measurement resource configured by the network device for the terminal device is at least QCLed with the corresponding first resource. A bandwidth occupied by the interference measurement resource configured by the network device for the terminal device is consistent with a bandwidth occupied by the corresponding first resource.

In this embodiment of this application, in a case in which the second resource or the third resource is a protocol default resource, the second resource or the third resource includes any one of the following: a configured PDCCH DMRS and a configured PDCCH. For example, for a SINR of an SSB, the default third resource may be a secondary synchronization signal or a demodulation reference signal (DMRS) of the PBCH.

Further, optionally, in this embodiment of this application, the RSSI and the noise and interference power are measured by the terminal device on REs (resource elements) of the SSB resource or the CSI-RS resource, or measured by the terminal device on OFDM symbols of the configured PDCCH DMRS and the configured PDCCH.

Further, optionally, in this embodiment of this application, the RSRP and the signal received power are measured by the terminal device on the REs of the SSB resource or the CSI-RS resource, or measured on frequency-domain RBs and time-domain OFDM symbols corresponding to the SSB resource or the CSI-RS resource.

Further, optionally, in this embodiment of this application, in a case in which the first resource is the CSI-RS resource, the network device does not configure the second resource and/or the third resource corresponding to the CSI-RS resource for the terminal device. In this case, the terminal device uses the default resource as the second resource and/or the third resource.

In one example, in the case in which the network device does not configure the second resource and/or the third resource corresponding to the CSI-RS resource for the terminal device, a linear average value of noise and interference powers (watts) of resource elements (RE) measured on the third resource corresponding to the first resource is obtained by the terminal device based on a first power. In this case, the second resource corresponding to the first resource is the first resource, that is, the CSI-RS resource, and a measurement quantity RSSI corresponding to one CSI-RS resource is a linear average value of total received powers (watts) of all resource elements for CSI-RS transmission in the CSI-RS resource.

The first power is a difference between a linear average value of received powers (watts) of resource elements used for CSI-RS transmission in each first resource (namely, the CSI-RS resource) and a linear average value of CSI-RS powers (watts), obtained through channel estimation, of resource elements for CSI-RS signal transmission.

Further, optionally, in this embodiment of this application, in a case in which the first resource is the SSB resource, the network device configures the second resource and/or the third resource corresponding to the SSB resource for the terminal device.

According to the method for reporting the CSI report in this embodiment of this application, the network device transmits the first information to the terminal device, so as to indicate that the CSI report to be reported by the terminal device includes the RSRQ and SINR, or to indicate that the CSI report to be reported by the terminal device includes at least two of the RSRP, RSRQ, and SINR. In other words, the RSRQ and/or the SINR are added to a legacy CSI report, so that an interference factor is considered in the CSI report, and the network device can select the most appropriate beam more accurately based on the CSI report for the terminal device, thereby improving communication efficiency and effects.

Figure 3:
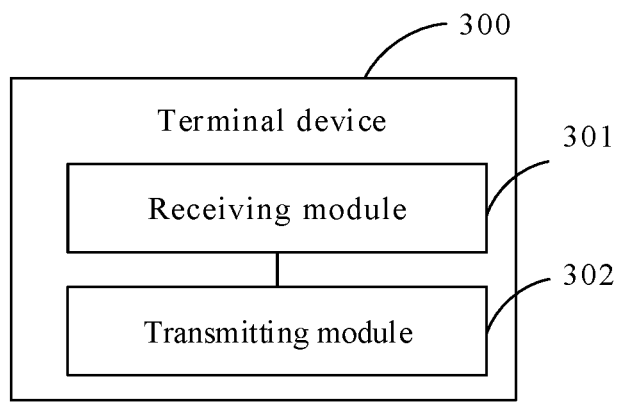
FIG. 3 is a schematic structural diagram 1 of a terminal device according to an embodiment of this application.

As shown in FIG. 3, an embodiment of this application provides a terminal device 300. The terminal device 300 includes:
 a receiving module 301, configured to receive first information from a network device, where
  the first information is used to indicate any one of the following measurement quantities: RSRQ and SINR;

or the first information is used to indicate at least two of the following measurement quantities: RSRP, RSRQ, and SINR; and a transmitting module 302, configured to report a CSI report to the network device according to the first information received by the receiving module 301, where the CSI report includes a measurement quantity indicated by the first information.

Optionally, in a case in which the first information is used to indicate at least two of the following measurement quantities: RSRP, RSRQ, and SINR, the first information is used to indicate the terminal device to report second information corresponding to a first measurement quantity and third information corresponding to at least one second measurement quantity, and the CSI report includes the second information and the third information. The first measurement quantity is one of at least two measurement quantities, and the at least one second measurement quantity is a measurement quantity other than the first measurement quantity in the at least two measurement quantities.

Optionally, the second information includes resource indexes of N first resources and first values corresponding to the N first resources, and the first values are used to indicate first measurement quantities corresponding to the N first resources. Third information of any one second measurement quantity includes resource indexes of Y first resources and second values corresponding to the Y first resources, or the second values; and the second values are used to indicate the any one second measurement quantities corresponding to the Y first resources. The N first resources or the Y first resources are at least one of M first resources configured by the network device for the terminal device. The M first resources include M CSI-RS resources or M SSB resources, where M and N are greater than or equal to 1, Y is greater than or equal to 0, M is greater than or equal to N, M is greater than or equal to Y, and N is greater than or equal to Y.

Optionally, the Y first resources are the same as a part or all of the N first resources.

Optionally, a sequence of the resource indexes of the Y first resources in the third information and/or a sequence of the second values corresponding to the Y first resources in the third information corresponds to a sequence of the resource indexes of the Y first resources in the N first resources of the second information.

Optionally, the N first resources are first resources corresponding to top N first measurement quantities in first measurement quantities of the M first resources that are ranked in descending order; and the Y first resources are first resources whose first measurement quantities are greater than a set threshold in the N first resources.

Optionally, in a case in which the first information is used to indicate any one of the following measurement quantities: RSRQ and SINR, the first information is used to indicate the terminal device to report fourth information, and the CSI report includes the fourth information. The fourth information includes indexes of N first resources and third values corresponding to the N first resources, and the third value are used to indicate the any one measurement quantities of the N first resources. The N first resources are at least one of M first resources configured by the network device for the terminal device; and the M first resources include: M CSI-RS resources or M SSB resources, where M and N are greater than or equal to 1, and M is greater than or equal to N.

Optionally, an RSRQ of one first resource is a ratio of an RSRP measured on the first resource to a received signal strength RSSI measured on a second resource corresponding to the first resource; and a SINR of one first resource is a ratio of a linear average value of signal received powers of resource elements measured on the first resource to a linear average value of noise and interference powers of resource elements measured on a third resource corresponding to the first resource. One second resource corresponds to at least one first resource, and/or one third resource corresponds to at least one first resource.

Optionally, the second resource is a protocol default resource, or the second resource is a resource configured by the network device for the terminal device. The third resource is a protocol default resource, or the third resource is a resource configured by the network device for the terminal device.

The terminal device in this embodiment of this application receives the first information transmitted by the network device, so that the terminal device is indicated to include the RSRQ and SINR in the CSI report to be reported, or the terminal device is indicated to include at least two of the RSRP, RSRQ, and SINR in the CSI report to be reported. In other words, the RSRQ and/or the SINR are added to a legacy CSI report, so that an interference factor is considered in the CSI report, and the network device can select the most appropriate beam more accurately based on the CSI report for the terminal device, thereby improving communication efficiency and effects.

The terminal device provided in this embodiment of this application can implement the processes shown in the foregoing method embodiment. To avoid repetition, details are not described herein again.

Figure 4:
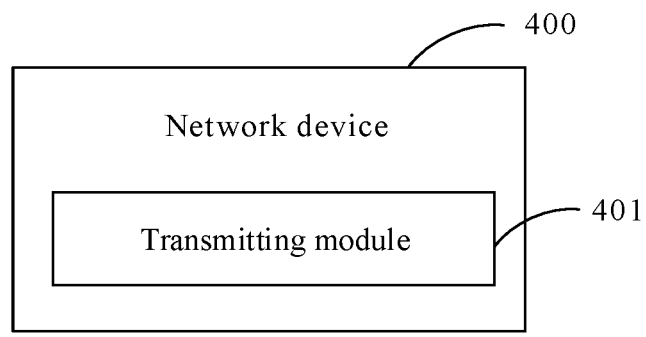
FIG. 4 is a schematic structural diagram 2 of a network device according to an embodiment of this application.

As shown in FIG. 4, an embodiment of this application provides a schematic structural diagram of a network device. The network device 400 includes a transmitting module 401.

The transmitting module 401 is configured to transmit first information to a terminal device.

The first information is used to indicate any one of the following measurement quantities: RSRQ and SINR; or the first information is used to indicate at least two of the following measurement quantities: RSRP, RSRQ, and SINR; and the first information is used to indicate the terminal device to report a CSI report to the network device according to the first information, where the CSI report includes a measurement quantity indicated by the first information.

Optionally, in a case in which the first information is used to indicate at least two of the following measurement quantities: RSRP, RSRQ, and SINR, the first information is used to indicate the terminal device to report second information corresponding to a first measurement quantity and third information corresponding to at least one second measurement quantity, and the CSI report includes the second information and the third information. The first measurement quantity is one of at least two measurement quantities. The at least one second measurement quantity is a measurement quantity other than the first measurement quantity in the at least two measurement quantities.

Optionally, the second information includes resource indexes of N first resources and first values corresponding to the N first resources, and the first values are used to indicate first measurement quantities corresponding to the N first resources. Third information of any one second measurement quantity includes resource indexes of Y first resources and second values corresponding to the Y first resources, or the second values; and the second values are used to indicate the any one second measurement quantities corresponding to the Y first resources. The N first resources or the Y first resources are at least one of M first resources configured by the network device for the terminal device. The M first resources include M CSI-RS resources or M SSB resources, where M and N are greater than or equal to 1, Y is greater than or equal to 0, M is greater than or equal to N, M is greater than or equal to Y, and N is greater than or equal to Y.

Optionally, the Y first resources are the same as a part or all of the N first resources.

Optionally, a sequence of the resource indexes of the Y first resources in the third information and/or a sequence of the second values corresponding to the Y first resources in the third information corresponds to a sequence of the resource indexes of the Y first resources in the N first resources of the second information.

Optionally, the N first resources are first resources corresponding to top N first measurement quantities in first measurement quantities of the M first resources that are ranked in descending order; and the Y first resources are first resources whose first measurement quantities are greater than a set threshold in the N first resources.

Optionally, in a case in which the first information is used to indicate any one of the following measurement quantities: RSRQ and SINR, the first information is used to indicate the terminal device to report fourth information, and the CSI report includes the fourth information. The fourth information includes indexes of N first resources and third values corresponding to the N first resources, and the third values are used to indicate the any one measurement quantities of the N first resources. The N first resources are at least one of M first resources configured by the network device for the terminal device; and the M first resources include: M CSI-RS resources or M SSB resources, where M and N are greater than or equal to 1, and M is greater than or equal to N.

Optionally, an RSRQ of one first resource is a ratio of an RSRP measured on the first resource to a received signal strength RSSI measured on a second resource corresponding to the first resource; and a SINR of one first resource is a ratio of a linear average value of signal received powers of resource elements measured on the first resource to a linear average value of noise and interference powers of resource elements measured on a third resource corresponding to the first resource. One second resource corresponds to at least one first resource, and/or one third resource corresponds to at least one first resource.

Optionally, the second resource is a protocol default resource, or the second resource is a resource configured by the network device for the terminal device. The third resource is a protocol default resource, or the third resource is a resource configured by the network device for the terminal device.

Optionally, in a case in which the first resource is the CSI-RS resource, the network device does not configure the second resource and/or the third resource corresponding to the CSI-RS resource for the terminal device.

Optionally, in a case in which the first resource is the SSB resource, the network device configures the second resource and/or the third resource corresponding to the SSB resource for the terminal device.

According to the network device in this embodiment of this application, the network device transmits the first information to the terminal device, so as to indicate that the CSI report to be reported by the terminal device includes the RSRQ and SINR, or to indicate that the CSI report to be reported by the terminal device includes at least two of the RSRP, RSRQ, and SINR. In other words, the RSRQ and/or the SINR are added to a legacy CSI report, so that an interference factor is considered in the CSI report, and the network device can select the most appropriate beam more accurately based on the CSI report for the terminal device, thereby improving communication efficiency and effects.

The network device provided in this embodiment of this application can implement the processes shown in the foregoing method embodiment. To avoid repetition, details are not described herein again.

Figure 5:
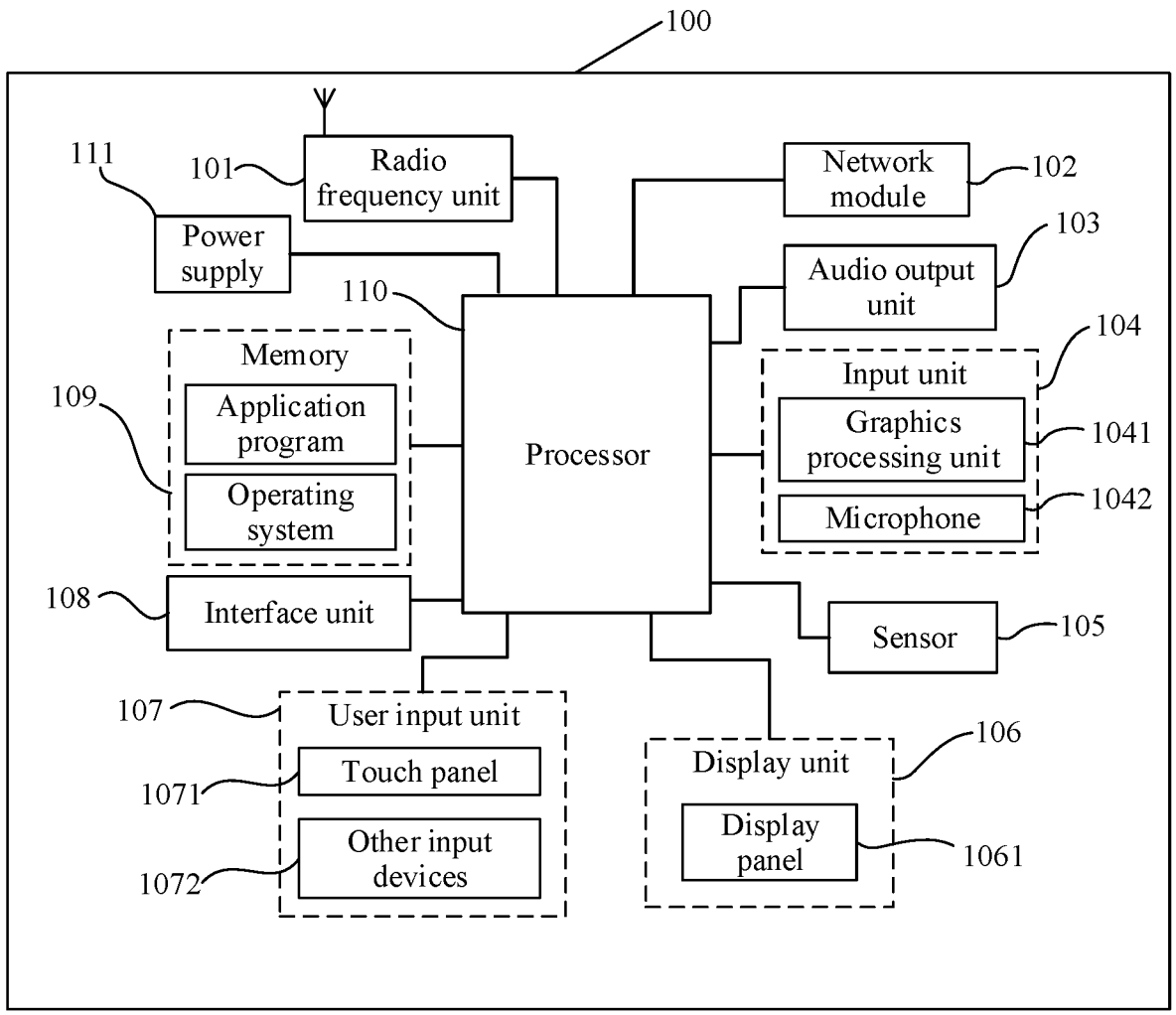
FIG. 5 is a schematic structural diagram 3 of a terminal device according to an embodiment of this application.

FIG. 5 is a schematic structural diagram of hardware of a terminal device for implementing the embodiments of this application. The terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art can understand that the structure of the terminal device 100 shown in FIG. 5 does not constitute any limitation on the terminal device. The terminal device 100 may include more or fewer components than those shown in the figure, or a combination of some components, or the components disposed differently. In this embodiment of this application, the terminal device 100 includes but is not limited to a mobile phone, a tablet computer, a laptop computer, a palmtop computer, an in-vehicle terminal device, a wearable device, a pedometer, and the like.

The radio frequency unit 101 is configured to receive first information from a network device. The first information is used to indicate any one of the following measurement quantities: RSRQ and SINR; or the first information is used to indicate at least two of the following measurement quantities: RSRP, RSRQ, and SINR. The radio frequency unit 101 is configured to report a CSI report to the network device according to the first information, where the CSI report includes a measurement quantity indicated by the first information.

The terminal device in this embodiment of this application receives the first information transmitted by the network device, so that the terminal device is indicated to include the RSRQ and SINR in the CSI report to be reported, or the terminal device is indicated to include at least two of the RSRP, RSRQ, and SINR in the CSI report to be reported. In other words, the RSRQ and/or the SINR are added to a legacy CSI report, so that an interference factor is considered in the CSI report, and the network device can select the most appropriate beam more accurately based on the CSI report for the terminal device, thereby improving communication efficiency and effects.

It should be understood that in this embodiment of this application, the radio frequency unit 101 may be configured to receive and send information, or to receive and send a signal in a call process, and specially, after receiving downlink data from a base station, send the downlink data to the processor 110 for processing; and also send uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may also communicate with a network and other devices via a wireless communications system.

The terminal device 100 provides a user with wireless broadband internet access through the network module 102, for example, helping the user to transmit and receive e-mails, browse web pages, and access streaming media.

The audio output unit 103 may convert audio data received by the radio frequency unit 101 or the network module 102 or stored in the memory 109 into an audio signal and output the audio signal as a sound. In addition, the audio output unit 103 may also provide audio output (for example, a call signal received sound or a message received sound) related to a specific function performed by the terminal device 100. The audio output unit 103 includes a speaker, a buzzer, a receiver, and the like.

The input unit 104 is configured to receive an audio or video signal. The input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. A processed image frame may be displayed on the display unit 106. The image frame processed by the graphics processing unit 1041 may be stored in the memory 109 (or another storage medium) or be sent by the radio frequency unit 101 or the network module 102. The microphone 1042 is capable of receiving sounds and processing such sounds into audio data. The processed audio data can be converted into a format output that can be sent to a mobile communication base station through the radio frequency unit 101 in a telephone call mode.

The terminal device 100 may further include at least one sensor 105, for example, an optical sensor, a motion sensor, and other sensors. Specifically, the optical sensor may include an ambient light sensor and a proximity sensor. The ambient light sensor may adjust luminance of the display panel 1061 based on brightness of ambient light, and the proximity sensor may turn off the display panel 1061 and/or backlight when the terminal device 100 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal device, functions related to vibration recognition (such as pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided to the user. The display unit 106 may include a display panel 1061, and the display panel 1061 may be configured in a form of a liquid crystal display (LCD), an organic light-emitting diode (OLED), or the like.

The user input unit 107 may be configured to receive input digit or character information and generate key signal input related to user setting and function control of the terminal device 100. Specifically, the user input unit 107 may include a touch panel 1071 and other input devices 1072. The touch panel 1071 is also referred to as a touchscreen and can collect a touch operation (such as an operation performed by the user on the touch panel 1071 or near the touch panel 1071 with a finger or by using any proper object or accessory such as a stylus) of the user on or near the touch panel 1071. The touch panel 1071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 110, and can receive a command sent by the processor 110 and execute the command. In addition, the touch panel 1071 may be implemented in a plurality of forms, for example, as a resistive, capacitive, infrared, or surface acoustic wave touch panel. In addition to the touch panel 1071, the user input unit 107 may further include other input devices 1072. Specifically, the other input devices 1072 may include but are not limited to a physical keyboard, a function key (such as a volume control key or a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. Although in FIG. 5, the touch panel 1071 and the display panel 1061 act as two independent components to implement input and output functions of the terminal device 100, in some embodiments, the touch panel 1071 and the display panel 1061 may be integrated to implement the input and output functions of the terminal device 100. This is not specifically limited herein.

The interface unit 108 is an interface between an external apparatus and the terminal device 100. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 108 may be configured to receive an input (for example, data information or power) from an external apparatus and transmit the received input to one or more components within the terminal 100, or may be configured to transmit data between the terminal device 100 and the external apparatus.

The memory 109 may be configured to store software programs and various data. The memory 109 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 109 may include a high-speed random access memory, and may further include a non-volatile memory such as a disk storage device, a flash memory device, or another volatile solid-state storage device.

The processor 110 is a control center of the terminal device 100, uses various interfaces and lines to connect parts of the entire terminal device 100, and executes various functions and processing data of the terminal device by running or executing software programs and/or modules stored in the memory 109 and invoking data stored in the memory 109, so as to perform overall monitoring on the terminal device 100. The processor 110 may include one or more processing units. Optionally, an application processor and a modem processor may be integrated in the processor 110. The application processor primarily processes an operating system, a user interface, an application program, and the like. The modem processor primarily processes radio communication. It can be understood that the modem processor may alternatively be not integrated in the processor 110.

The terminal device 100 may further include a power supply 111 (such as a battery) that supplies power to components. Optionally, the power supply 111 may be logically connected to the processor 110 through a power management system. In this way, functions such as charge management, discharge management, and power consumption management are implemented by using the power management system.

In addition, the terminal device 100 includes some functional modules that are not shown. Details are not described herein.

Figure 6:
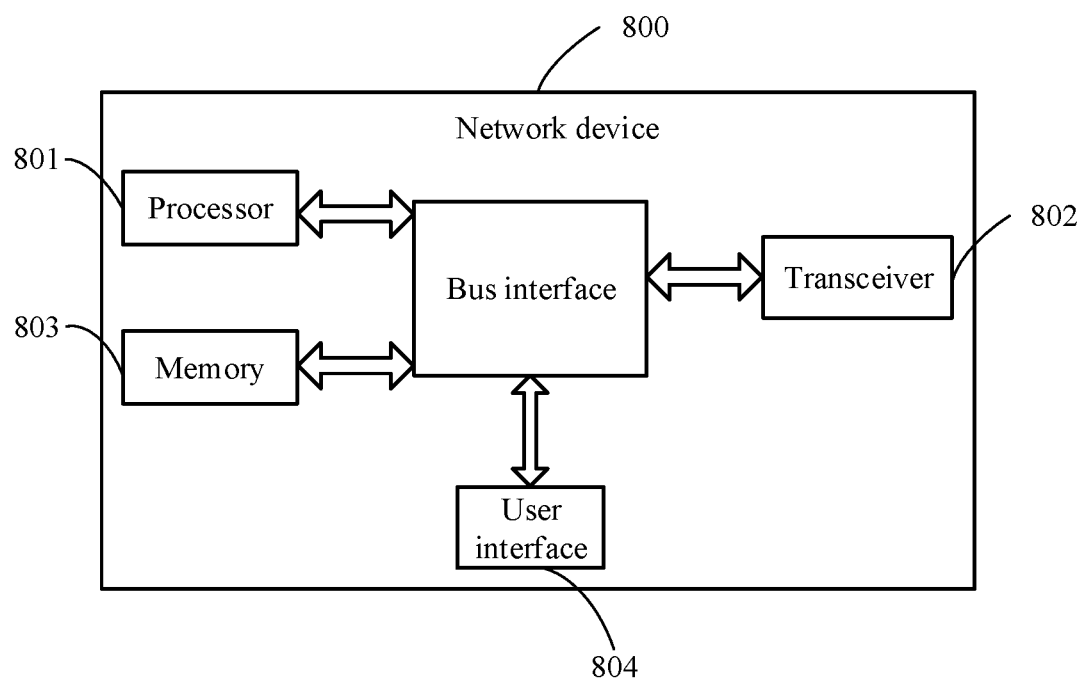
FIG. 6 is a schematic structural diagram 4 of a network device according to an embodiment of this application.

FIG. 6 is a schematic diagram of a hardware structure of a network device for implementing an embodiment of this application. The network device 800 includes a processor 801, a transceiver 802, a memory 803, a user interface 804, and a bus interface.

The transceiver 802 is configured to transmit first information to a terminal device. The first information is used to indicate any one of the following measurement quantities: RSRQ and SINR; or the first information is used to indicate at least two of the following measurement quantities: RSRP, RSRQ, and SINR. The first information is used to indicate the terminal device to report a CSI report to the network device according to the first information, where the CSI report includes a measurement quantity indicated by the first information.

According to the network device in this embodiment of this application, the network device transmits the first information to the terminal device, so as to indicate that the CSI report to be reported by the terminal device includes the RSRQ and SINR, or to indicate that the CSI report to be reported by the terminal device includes at least two of the RSRP, RSRQ, and SINR. In other words, the RSRQ and/or the SINR are added to a legacy CSI report, so that an interference factor is considered in the CSI report, and the network device can select the most appropriate beam more accurately based on the CSI report for the terminal device, thereby improving communication efficiency and effects.

In this embodiment of this application, in FIG. 6, a bus architecture may include any quantity of interconnected buses and bridges, and specifically connects together circuits that are of one or more processors represented by the processor 801 and of a memory represented by the memory 803. The bus architecture may further interconnect various other circuits such as a peripheral device, a voltage regulator, and a power management circuit. These are all well known in the art, and therefore are not further described in this specification. The bus interface provides an interface. The transceiver 802 may be a plurality of components, including a transmitter and a receiver, and provides units for communicating with a variety of other apparatuses on a transmission medium. For different user equipments, the user interface 804 may also be an interface that can be externally or internally connected to a required device. The connected device includes but is not limited to a keypad, a display, a speaker, a microphone, a joystick, and the like. The processor 801 is responsible for management of the bus architecture and general processing, and the memory 803 is capable of storing data that is used by the processor 801 during operation.

In addition, the network device 800 further includes some functional modules that are not shown. Details are not described herein.

Optionally, an embodiment of this application further provides a terminal device, including a processor, a memory, and a computer program stored in the memory and capable of running on the processor. When the computer program is executed by the processor, the processes of the method for reporting the CSI report in the foregoing embodiment can be implemented and a same technical effect can be achieved. To avoid repetition, details are not described herein again.

Optionally, an embodiment of this application further provides a network device, including a processor, a memory, and a computer program stored in the memory and capable of running on the processor. When the computer program is executed by the processor, the processes of the method for reporting the CSI report in the foregoing embodiment can be implemented and a same technical effect can be achieved. To avoid repetition, details are not described herein again.

An embodiment of this application further provides a computer-readable storage medium, where a computer program is stored in the computer-readable storage medium. When the computer program is executed by the processor, a plurality of processes of the method for reporting the CSI report in the foregoing embodiments can be implemented and a same technical effect can be achieved. To avoid repetition, details are not described herein again. The computer-readable storage medium is, for example, a read-only memory (ROM for short), a random access memory (RAM for short), a magnetic disk, or an optical disc.

An embodiment of this application further provides a computer-readable storage medium, where a computer program is stored in the computer-readable storage medium. When the computer program is executed by a processor, a plurality of processes of the method for reporting the CSI report the foregoing embodiment can be implemented. To avoid repetition, details are not described herein again. The computer-readable storage medium is, for example, a ROM, a RAM, a magnetic disk, or an optical disc.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the plurality of embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A method for reporting a channel state information CSI report, applied to a terminal device, wherein the method comprises:
receiving first information from a network device;
reporting a CSI report to the network device according to the first information, wherein the CSI report comprises a measurement quantity indicated by the first information;
wherein the first information is used to indicate signal to interference plus noise ratio L1-SINR;
wherein an L1-SINR of a first resource is a ratio of a linear average value of signal received powers of resource elements measured on the first resource to a linear average value of noise and interference powers of resource elements measured on a third resource corresponding to the first resource, the first resource is resource elements REs of a channel state information reference signal CSI-RS resource; and
when the network device configures an interference measurement resource for the terminal device, using the interference measurement resource as the third resource; otherwise, using the REs of the CSI-RS resource as the third resource.

2. The method according to claim 1, wherein the first information is further used to indicate at least one of the following measurement quantities: reference signal received quality L1-RSRQ, and reference signal received power RSRP;
in a case in which the first information is used to indicate at least two of the following measurement quantities: RSRP, L1-RSRQ, and L1-SINR, the first information is used to indicate the terminal device to report second information corresponding to a first measurement quantity and third information corresponding to at least one second measurement quantity; and
the CSI report comprises the second information and the third information, wherein
the first measurement quantity is one of at least two measurement quantities, and the at least one second measurement quantity is a measurement quantity other than the first measurement quantity in the at least two measurement quantities.

3. The method according to claim 2, wherein
the second information comprises resource indexes of N first resources and first values corresponding to the N first resources, and the first values are used to indicate first measurement quantities corresponding to the N first resources;
third information of any one second measurement quantity comprises resource indexes of Y first resources and second values corresponding to the Y first resources, or the second values;
and the second values are used to indicate the any one second measurement quantities corresponding to the Y first resources;
the N first resources or the Y first resources are at least one of M first resources configured by the network device for the terminal device; and
the M first resources comprise M channel state information reference signal CSI-RS resources or M synchronization signal block SSB resources, wherein M and N are greater than or equal to 1, Y is greater than or equal to 0, M is greater than or equal to N, M is greater than or equal to Y, and N is greater than or equal to Y.

4. The method according to claim 3, wherein the Y first resources are the same as a part of or all of the N first resources.

5. The method according to claim 4, wherein a sequence of the resource indexes of the Y first resources in the third information and/or a sequence of the second values corresponding to the Y first resources in the third information corresponds to a sequence of the resource indexes of the Y first resources in the N first resources of the second information.

6. The method according to claim 3, wherein
the N first resources are first resources corresponding to top N first measurement quantities in first measurement quantities of the M first resources that are ranked in descending order; and
the Y first resources are first resources whose first measurement quantities are greater than a set threshold in the N first resources.

7. The method according to claim 1, wherein
the first information is used to indicate the terminal device to report fourth information, and the CSI report comprises the fourth information;
the fourth information comprises indexes of N first resources and third values corresponding to the N first resources, and the third values are used to indicate the any one measurement quantities of the N first resources;
the N first resources are at least one of M first resources configured by the network device for the terminal device; and
the M first resources comprise: M channel state information reference signal CSI-RS resources or M synchronization signal block SSB resources, wherein M and N are greater than or equal to 1, and M is greater than or equal to N.

8. The method according to claim 1, wherein an L1-RSRQ of a first resource is a ratio of an RSRP measured on the first resource to a received signal strength RSSI measured on a second resource corresponding to the first resource; and
one second resource corresponds to at least one first resource, and/or one third resource corresponds to at least one first resource.

9. The method according to claim 8, wherein the second resource is a protocol default resource, or the second resource is a resource configured by the network device for the terminal device; and
the third resource is a protocol default resource, or the third resource is a resource configured by the network device for the terminal device.

10. A method for reporting a channel state information CSI report, applied to a network device, wherein the method comprises:
transmitting first information to a terminal device, wherein
the first information is used to indicate signal to interference plus noise ratio L1-SINR; and the first information is used to indicate the terminal device to report a CSI report to the network device according to the first information, wherein the CSI report comprises a measurement quantity indicated by the first information;
wherein an L1-SINR of a first resource is a ratio of a linear average value of signal received powers of resource elements measured on the first resource to a linear average value of noise and interference powers of resource elements measured on a third resource corresponding to the first resource, the first resource is resource elements REs of a channel state information reference signal CSI-RS resource; and when the network device configures an interference measurement resource for the terminal device, using the interference measurement resource as the third resource; otherwise, using the REs of the CSI-RS resource as the third resource.

11. The method according to claim 10, wherein the first information is further used to indicate at least one of the following measurement quantities: reference signal received quality L1-RSRQ, and reference signal received power RSRP;

in a case in which the first information is used to indicate at least two of the following measurement quantities: RSRP, L1-RSRQ, and L1-SINR, the first information is used to indicate the terminal device to report second information corresponding to a first measurement quantity and third information corresponding to at least one second measurement quantity; and the CSI report comprises the second information and the third information, wherein the first measurement quantity is one of at least two measurement quantities, and the at least one second measurement quantity is a measurement quantity other than the first measurement quantity in the at least two measurement quantities.

12. The method according to claim 10, wherein the first information is used to indicate the terminal device to report fourth information, and the CSI report comprises the fourth information;

the fourth information comprises indexes of N first resources and third values corresponding to the N first resources, and the third values are used to indicate the any one measurement quantities of the N first resources;

the N first resources are at least one of M first resources configured by the network device for the terminal device; and the M first resources comprise: M channel state information reference signal CSI-RS resources or M synchronization signal block SSB resources, wherein M and N are greater than or equal to 1, and M is greater than or equal to N.

13. The method according to claim 10, wherein an L1-RSRQ of a first resource is a ratio of an RSRP measured on the first resource to a received signal strength RSSI measured on a second resource corresponding to the first resource; and one second resource corresponds to at least one first resource, and/or one third resource corresponds to at least one first resource.

14. The method according to claim 13, wherein the second resource is a protocol default resource, or the second resource is a resource configured by the network device for the terminal device; and the third resource is a protocol default resource, or the third resource is a resource configured by the network device for the terminal device.

15. A terminal device, comprising a processor, a memory, and a computer program stored in the memory and capable of running on the processor, wherein the computer program is executed by the processor to perform steps of:

receiving first information from a network device;

reporting a CSI report to the network device according to the first information, wherein the CSI report comprises a measurement quantity indicated by the first information;

wherein the first information is used to indicate signal to interference plus noise ratio L1-SINR;

wherein an L1-SINR of a first resource is a ratio of a linear average value of signal received powers of resource elements measured on the first resource to a linear average value of noise and interference powers of resource elements measured on a third resource corresponding to the first resource, the first resource is resource elements REs of a channel state information reference signal CSI-RS resource; and when the network device configures an interference measurement resource for the terminal device, using the interference measurement resource as the third resource; otherwise, using the REs of the CSI-RS resource as the third resource.

16. The terminal device according to claim 15, wherein the first information is used to indicate the terminal device to report fourth information, and the CSI report comprises the fourth information;

the fourth information comprises indexes of N first resources and third values corresponding to the N first resources, and the third values are used to indicate the any one measurement quantities of the N first resources;

the N first resources are at least one of M first resources configured by the network device for the terminal device; and the M first resources comprise: M channel state information reference signal CSI-RS resources or M synchronization signal block SSB resources, wherein M and N are greater than or equal to 1, and M is greater than or equal to N.

17. The terminal device according to claim 15, wherein an L1-RSRQ of a first resource is a ratio of an RSRP measured on the first resource to a received signal strength RSSI measured on a second resource corresponding to the first resource; and one second resource corresponds to at least one first resource, and/or one third resource corresponds to at least one first resource.

18. The terminal device according to claim 17, wherein the second resource is a protocol default resource, or the second resource is a resource configured by the network device for the terminal device; and the third resource is a protocol default resource, or the third resource is a resource configured by the network device for the terminal device.

19. The terminal device according to claim 15, wherein the first information is further used to indicate at least one of the following measurement quantities: reference signal received quality L1-RSRQ, and reference signal received power RSRP;

in a case in which the first information is used to indicate at least two of the following measurement quantities: RSRP, L1-RSRQ, and L1-SINR, the first information is used to indicate the terminal device to report second information corresponding to a first measurement quantity and third information corresponding to at least one second measurement quantity; and the CSI report comprises the second information and the third information, wherein the first measurement quantity is one of at least two measurement quantities, and the at least one second measurement quantity is a measurement quantity other than the first measurement quantity in the at least two measurement quantities.

20. The terminal device according to claim 19, wherein
the second information comprises resource indexes of N first resources and first values corresponding to the N first resources, and the first values are used to indicate first measurement quantities corresponding to the N first resources;

third information of any one second measurement quantity comprises resource indexes of Y first resources and second values corresponding to the Y first resources, or the second values; and the second values are used to indicate the any one second measurement quantities corresponding to the Y first resources;

the N first resources or the Y first resources are at least one of M first resources configured by the network device for the terminal device; and the M first resources comprise M channel state information reference signal CSI-RS resources or M synchronization signal block SSB resources, wherein M and N are greater than or equal to 1, Y is greater than or equal to 0, M is greater than or equal to N, M is greater than or equal to Y, and N is greater than or equal to Y.

\* \* \* \* \*